(12) United States Patent
Okuda

(10) Patent No.: US 8,509,229 B2
(45) Date of Patent: Aug. 13, 2013

(54) SENDING STATION, RELAY STATION, AND RELAY METHOD

(75) Inventor: Masato Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 436 days.

(21) Appl. No.: 12/480,183

(22) Filed: Jun. 8, 2009

(65) Prior Publication Data

US 2009/0245166 A1 Oct. 1, 2009

Related U.S. Application Data

(63) Continuation of application No. PCT/JP2006/325641, filed on Dec. 22, 2006.

(51) Int. Cl.
*H04L 12/28* (2006.01)
*H04L 12/56* (2006.01)

(52) U.S. Cl.
USPC ......... 370/389; 370/392; 370/394; 370/395.3

(58) Field of Classification Search
USPC .............................. 370/389, 392, 394, 395.3
See application file for complete search history.

(56) References Cited

U.S. PATENT DOCUMENTS

| | | | |
|---|---|---|---|
| 7,574,208 B2 * | 8/2009 | Hanson et al. ............. | 455/435.1 |
| 2002/0055980 A1 * | 5/2002 | Goddard ....................... | 709/217 |
| 2003/0035413 A1 | 2/2003 | Herle et al. | |
| 2005/0008035 A1 * | 1/2005 | Eklund et al. ................. | 370/473 |
| 2005/0243834 A1 | 11/2005 | Fukuda | |
| 2007/0147402 A1 * | 6/2007 | Khanna et al. ................ | 370/412 |
| 2008/0043741 A1 * | 2/2008 | Kuo .............................. | 370/394 |
| 2010/0257420 A1 * | 10/2010 | Chen et al. ................... | 714/748 |

FOREIGN PATENT DOCUMENTS

| | | |
|---|---|---|
| JP | 2003069642 | 3/2003 |
| JP | 2005012698 | 1/2005 |
| WO | 2004112326 | 12/2004 |
| WO | 2007053950 A1 | 5/2007 |

OTHER PUBLICATIONS

Christian Hoymann, et al. "Multihop Communication in Relay Enhanced IEEE 802.16 Networks", Personal, Indoor and Mobile Radio Communications, 2006 IEEE 17th International Symposium on, IEEE, PI, Sep. 1, 2006, pp. 1-4, XP031023538.
Extended European Search Report dated Apr. 28, 2011 received in Application No. 06835119.6-2416 /2096803 PCT/JP2006325641.
International Search Report dated Mar. 13, 2007.
"IEEE Standard for Local and Metropolitan area networks Part 16: Air Interface for Fixed and Mobile Broadband Wireless Access Systems" Amendment 2: Physical and Medium Access Control Layers for Combined Fixed and Mobile Operation in Licensed Bands and Corrigendum 1 IEEE Computer Society and the IEEE Microwave Theory and Techniques Society IEEE Std 802.16e-2005 and IEEE Std 802.16/2004/Cor1-2005; Feb. 28, 2006.
"IEEE Standard for Local and metropolitan area networks Part 16: Air Interface for Fixed Broadband Wireless Access Systems" IEEE Computer Society and the IEEE Microwave Theory and Techniques Society IEEE Std 802.16-2004.

\* cited by examiner

*Primary Examiner* — Farah Faroul
(74) *Attorney, Agent, or Firm* — Fujitsu Patent Center

(57) ABSTRACT

In a relay station, a packet fragmented by a sending station is received. The fragmented packet is selectively further fragmented into a plurality of refragmented packets. Identification information (FSN) is added to each of the refragmented packets and to a non-refragmented packet not fragmented. Each of the packets to which the identification information (FSN) has been added is transmitted to a receiving station. This makes it possible to prevent a conflict of information (FSN) between packets due to the packet refragmentation in the relay station.

8 Claims, 15 Drawing Sheets

FIG. 5(a)

| FC 2b | FSN 11b | Length (LSB) 8b | Length (MSB) 3b |

FIG. 5(b)

| FC 2b | FSN 3b | Length 11b |

SENDING STATION, RELAY STATION, AND RELAY METHOD

CROSS-REFERENCE TO RELATED APPLICATION(S)

This application is a continuation Application of a PCT international application No. PCT/JP2006/325641 filed on Dec. 22, 2006 in Japan, the entire contents of which are incorporated by reference.

TECHNICAL FIELD

The present invention relates to a sending station, a relay station, and a relay method, for example to a technique particularly suitable in the case where, in a relay station that receives a packet fragmented and transmitted by a sending station and retransmits (relays) it to a receiving station, the fragmented packet is further fragmented and relayed.

BACKGROUND ART

Wireless communication systems, such as W-CDMA (Wideband Code Division Multiple Access) and CDMA2000 communication systems, which perform communication through wireless communication channels have spread worldwide. In such wireless communication systems, a plurality of radio base stations are deployed in a service area, and a radio terminal communicates with another through any of the radio base stations. In this wireless communication, adjacent radio base stations have an overlapping zone between their wireless communicable service areas so that even when the wireless communication environment worsens, signals can be handed over between the base stations.

The wireless communication method adopts code division multiplexing, time division multiplexing, frequency division multiplexing, orthogonal frequency division multiplexing, and so forth. Therefore, multiple radio terminals are usually able to connect with one radio station at the same time.

However, even within the wireless communicable service area of a radio base station, it is often difficult to perform high-speed communication in the vicinity of the area boundary because the wireless communication environment is not very satisfactory. In addition, even within the area, the propagation of radio signals is disturbed by buildings, etc., so that an insensitive zone sometimes occurs in which a satisfactory radio connection with a radio base station is difficult.

Hence, it has been proposed that relay stations (RSs) are disposed within the service area of the radio base stations so that the radio terminals and radio base stations can perform wireless communication via RSs. Particularly, in the task group of the IEEE 802.16j, the introduction of such a relay station is now being examined.

Matters on the IEEE 802.16 are disclosed, for example, in the following nonpatent documents:
Nonpatent document 1: IEEE Std 802.16-2004
Nonpatent document 2: IEEE Std 802.16e-2005

SUMMARY OF THE INVENTION

Problems to be Solved by the Invention

According to the background art described above, a radio terminal (mobile state (MS)) can communicate with a base station (BS) directly or through a relay station (RS), but it is necessary to examine how the radio terminal (MS) utilizes the relay station (RS). This is because there is no guarantee that in the communication via RS, the radio resources, modulation methods, and the like between BS and RS are the same as those between RS and MS.

An example is illustrated in FIG. 12. In the figure, a 1500-byte IP (Internet Protocol) packet (herein after referred as simply to a packet) is transferred from BS through RS and to MS. In this downlink (DL), BS and RS are often deployed so that they can satisfactorily communicate with each other, so in many cases high-speed communication is possible using multi-valued modulation etc.

For instance, in the case where the downlink (DL) communication from BS to RS is performed using 64QAM (Quadrature Amplitude Modulation) when a rate of encoding error correction codes is ½, the DL communication can be performed with an efficiency of 3 bits/symbol. Therefore, a 1500-byte IP packet can be transmitted by 4000 symbols.

In contrast to this, since the DL communication from RS to MS is often Non-line-of-sight communication, the case capable of using multi-valued modulation is reduced compared with the DL communication from BS to RS. FIG. 12 shows the case where the modulation method is QPSK (Quadrature Phase-Shift Keying) and the encoding rate is ½, and in this case, the DL communication from RS to MS is done with an efficiency of 1 bit/symbol.

At this time, assuming that the radio resource of the same amount as the radio resource from BS to RS (4000 symbols) is assigned to the DL communication from RS to MS, RS can transmit only 500 bytes to MS. For that reason, for example, RS needs to fragment a 1500-byte IP packet (fragmentation), transmit a 500-byte packet to MS, and transmit the remaining 1000 bytes at the next transmission chance.

The aforementioned nonpatent document 1 defines a function of fragmenting a packet. According to the nonpatent document 1, when an MAC-SDU (Service Data Unit), such as an IP packet etc., is fragmented into a plurality of pieces, a fragmentation subheader is added to each fragment.

The fragmentation subheader, in fragmenting an MAC-SDU into a plurality of MAC-SDUs and transmitting them, is used to add to each fragmented SDU a sequence number and control bits (FC: Fragmentation Control) that indicates which part (location) of the original packet the fragmented SDU belongs to. Note that an MAC-SDU (IP packet etc.) to which a GMH (Generic MAC header) and a fragmentation subheader have been added is referred to as an MAC-PDU.

FIG. 13 illustrates a typical example of the fragmentation. In the figure, as illustrated in (1), a certain MAC-ADU (sic) #1 is fragmented into a first MAC-SDU #1-1 and a second MAC-SDU #1-2, and a GMH and a fragmentation subheader (indicated by the shaded portion) are added to each fragment, whereby two MAC-PDUs are formed. In (2), a GMH and a subheader are added to an MAC-SDU #2 not fragmented, whereby one MAC-PDU is formed. Although not illustrated in FIG. 13, a CRC (Cyclic Redundancy Check) error-checking code may be added to the MAC-PDU to detect an error.

As to the format of the fragmentation subheader, for example, in the case where an ARQ (Automatic Repeat Request) is disabled, two following patterns are prepared according to connection type:
(a) ARQ-disabled and Extended-Type Connection
(b) ARQ-disabled and non-Extended-Type Connection The two patterns are illustrated in FIGS. 14(a) and 14(b), respectively. The former pattern, as illustrated in FIG. 14(a), has an FC (Fragmentation Control) field (two bits), an FSN (Fragment Sequence Number) field (11 bits) in which a sequence number is added to each fragmented MAC-SDU, and a reserved field (3 bits). The latter format, as illustrated in FIG. 14(b), has an FC field (2 bits), an FSN field (3 bits), and a reserved field (3 bits).

Each field in the fragmentation subheader format is explained in the following Table 1.

TABLE 1

Fragmentation Subheader Format

| Field name | Description |
|---|---|
| FC | 00: No fragment |
| | 01: Last fragment |
| | 10: First fragment |
| | 11: Middle fragment |
| FSN | The sequence number of SDU fragment |

The FC field is a fragmentation control bit representing the location of a fragment. As illustrated in Table 1, FC=00 represents that this MAC-SDU is not a fragment, FC=01 represents the last fragment of the fragmented MAC-SDUs, FC=10 represents the first fragment of the fragmented MAC-SDUs, and FC=11 represents the middle fragment of the fragmented MAC-SDUs. The FSN field represents a sequence number that is incremented one by one in a series of fragmented MAC-SDUs.

Therefore, when the MAC-SDU fragmented in BS is further fragmented in RS, a conflict is caused between FSNs, and consequently, the MAC-PDU can not be reconstructed accurately from the fragemented MAC-SDUs at the receiving side. An example of the conflict is illustrated in FIG. 15. In the case where in BS a certain MAC-SDU is fragmented into two and FSN=1 and FSN=2 are respectively added to the two, for example, when in RS the fragmented MAC-SDU with FSN=1 is further fragmented into two, FSN=1 and FSN=2 are sometimes added to the two. In such a case, in RS, a conflict takes place between FSN=2, which has been added to the MAC-SDU fragmented in BS but not fragmented in RS, and FSN=2, which has been added to the MAC-SDU fragmented in both BS and RS.

The present invention has been made in view of the problems described above. Accordingly, an object of the present invention is to prevent the occurrence of a conflict between FSNs that is caused by further fragmentation of a received packet (fragmented packet) in a relay station.

Still another of this invention is to facilitate a packet fragmentation process in a relay station and implement the fragmentation and relay of a packet capable of preventing the above-described conflict and mismatch, by packing packets that were fragmented beforehand into blocks which are used as a unit of fragmentation in the relay station, and then transmitting the packed packet to the relay station.

A further object of this invention is to make further utilization of radio resources possible by reducing the size of the packed packet that is transmitted to the relay station.

It is noted that accomplishing advantageous effects that are derived from the following preferred embodiments of the present invention but not obtained by prior art, in addition to the above objects, can also be positioned as one of other objects of the invention.

Means for Solving the Problems

To achieve the above objects, the important features of the present invention reside in the following systems and methods.

(1) A first aspect of the relay station of the present invention is a relay station for receiving a packet transmitted from a sending station and relaying the packet to a receiving station. The relay station comprises a packet receiver configured to receive a packet fragmented in the sending station; a packet fragmenting unit configured to selectively further refragment the packet received by the packet receiver into a plurality of refragmented packets; a controller configured to add identification information to each of the refragmented packets and to a packet not refragmented in the packet fragmenting unit; and a packet transmitting unit configured to transmit to the receiving station each of the packets to which the identification information has been added by the controller.

(2) In the first aspect of the relay station, the packet fragmenting unit may include a fragmentation determiner that, based on a predetermined reference, determining whether the packet received by the packet receiver is further fragmented into the plurality of refragmented packets; and a packet refragmenting unit that refragments the fragmented packet if the fragmentation determiner determines that the fragmented packet is further fragmented.

(3) In addition, if a packet size of the fragmented packet received by the packet receiver exceeds a size that is transmittable to the receiving station at that time, the fragmentation determiner may determine that the fragmented packet is further fragmented.

(4) The controller may include a sequence number assigner for adding a sequence number to the refragmented packet and the non-refragmented packet as the identification information regardless of the refragmentation.

(5) The controller may further include a sequence number manager for managing the sequence number according to a connection with the receiving station, and the sequence number assigner may add the sequence number to the refragmented packet and non-refragmented packet of the same connection under management of the sequence number manager.

(6) A second aspect of the relay station of the present invention is a relay station for receiving a packet transmitted from a sending station and relaying the packet to a receiving station. The relay station comprises a packet receiver configured to receive a fragmented packet which contains a fragment of the packet fragmented in the sending station, and also contains control information representing which part of the packet the fragment belongs to before fragmentation; a packet fragmenting unit configured to selectively further refragment the packet received by the packet receiver into a plurality of refragmented packets; a controller configured to add to the refragmented packets renewed control information which matches with the control information added before the refragmentation, based on the control information; and a packet transmitting unit configured to transmit the refragmented packets to which the renewed control information has been added, and the packet not refragmented by the packet fragmenting unit, to the receiving station.

(7) In the second aspect of the relay station, the second information may contain information representing any one of four states: nonfragmentation, first packet, middle packet, and last packet.

(8) In addition, if the control information contained in the fragmented packet received by the packet receiver represents a first packet, the controller may add control information representing a first packet to one of the refragmented packets and control information representing a middle packet to the other. If the control information contained in the fragmented packet represents a middle packet, the controller may add information representing a middle packet to each of the refragmented packets. If the control information contained in the fragmented packet represents a last packet, the controller may add control information representing a last packet to one of the refragmented packets and control information representing a middle packet to the other.

(9) A first aspect of the sending station of the present invention is a sending station for transmitting a packet to a relay station that receives the packet and relays the packet to a receiving station. The sending station includes a packet fragmenting unit configured to fragment a packet into a plurality of blocks that are used as a unit of fragmentation in the relay station; a controller configured to add identification information to each of the blocks fragmented by the packet fragmenting unit; a packet packing unit configured to pack some of the blocks to which the identification information has been added; and a packet transmitting unit configured to transmit the packets packed by the packet packing unit to the relay station.

(10) In the first aspect of the sending station, it may further include a header assigner for adding header information to the packets packed by the packet packing unit.

(11) In addition, the identification information may be a sequence number that is incremented one by one in the blocks.

(12) Furthermore, the packet packing unit may pack blocks that are the same in a connection with the receiving station.

(13) A third aspect of the relay station of the present invention is a relay station for receiving a packet transmitted by a sending station and relaying the packet to a receiving station. The relay station includes a packet receiver for receiving as a packet a plurality of blocks fragmented in the sending station which have been assigned identification information respectively, packed into one, and transmitted by the sending station; a packet fragmenting unit which, if it is necessary to fragment and transmit the packet received by the packet receiver to the receiving station, separates the packet into the plurality of blocks to generate a plurality of fragmented packets; and a packet transmitting unit configured to transmit to the receiving station the plurality of fragmented packets generated by the packet fragmenting unit.

(14) In the third aspect of the relay station, the identification information may be a sequence number that is incremented one by one in the blocks.

(15) A first aspect of the relay method of the present invention is a relay method for use in a relay station that receives a packet transmitted from a sending station and relays the packet to a receiving station. The relay method comprises the steps of receiving a packet fragmented in the sending station; selectively further fragmenting the fragmented packet into a plurality of refragmented packets; adding identification information to each of the refragmented packets and to a non-refragmented packet not fragmented; and transmitting to the receiving station each of the packets to which the identification information has been added.

(16) A second aspect of the relay method of the present invention is a relay method for use in a relay station that receives a packet transmitted from a sending station and relays the packet to a receiving station. The relay method comprises the steps of receiving a fragmented packet which contains a fragment of the packet fragmented in the sending station, and also contains control information representing which part of the packet the fragment belongs to before fragmentation; selectively further refragmenting the fragmented packet into a plurality of refragmented packets; adding to the refragmented packets renewed control information which matches with the control information added before the refragmentation, based on the control information; and transmitting the refragmented packets to which the renewed control information has been added, and a packet not refragmented, to the receiving station.

(17) A third aspect of the relay method of the present invention is a relay method for a relay station to receive a packet transmitted from a sending station and relay the packet to a receiving station. The sending station fragments a packet into a plurality of blocks that are used as a unit of fragmentation in the relay station; adds identification information to each of the plurality of blocks; packs some of the blocks to which the identification information has been added; and transmits the packed packet to the relay station. The relay station receives the packet from the sending station; if it is necessary to fragment and transmit the received packet to the receiving station, separates the packet into the plurality of blocks to generate a plurality of fragmented packets; and transmits the plurality of fragmented packets to the receiving station.

Advantages of the Invention

The present invention possesses the following effects and advantages:

(1) The conflict of information (such as FSN etc.) and mismatch of control information between a fragmented packet and a nonfragmented packet resulting from further packet fragmentation in the relay station can be prevented, so the relay station can perform flexible packet fragmentation and relay according to radio resources such as radio bands which can be utilized between itself and the receiving station. Thus, it becomes possible to utilize radio resources.

(2) In the sending station, by fragmenting a packet beforehand into a plurality of blocks that are used as a unit of further fragmentation in the relay station, adding identification information, such as FSN etc., to each block and packing and sending these blocks to the relay station, the relay station is able to separate the received packet into the blocks without managing FSN and control information. Consequently, with the above-described conflict of information and mismatch of control information being prevented, it becomes possible to perform packet fragmentation and relay according to radio resources between the relay station and the receiving station.

(3) By adding header information to the aforementioned packet after being packed, the header information can greatly be reduced compared with the case of adding header information to each block described above, so further utilization of radio resources becomes possible.

BRIEF DESCRIPTION OF THE DRAWINGS

FIGS. 5(a) and 5(b) are diagrams illustrating format examples of the subheader (packing subheader) used in the packing format illustrated in FIG. 4;

FIGS. 14(*a*) and 14(*b*) are diagrams illustrating format examples of the subheader (fragmentation subheader) used in the packet format illustrated in FIG. 13.

Figure 1:
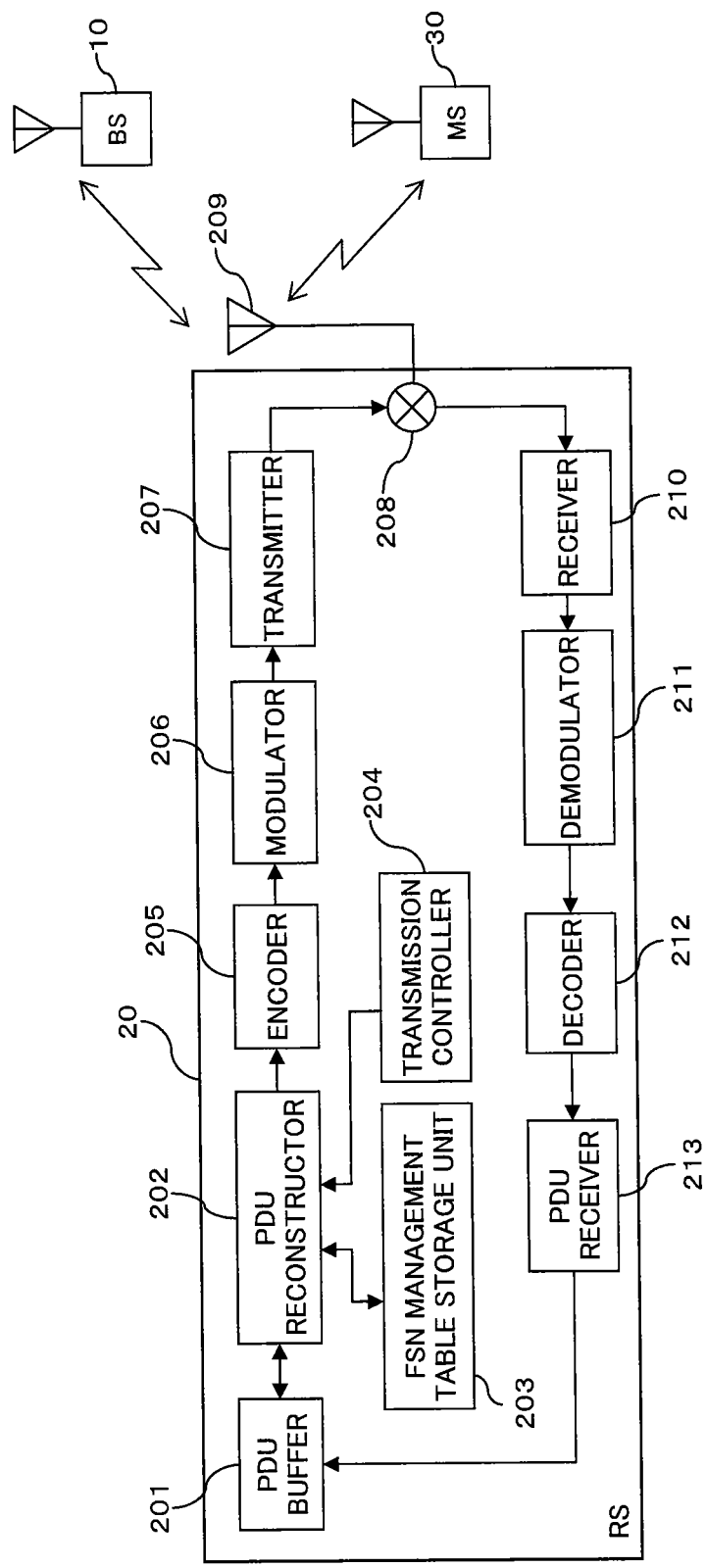
FIG. 1 is a block diagram illustrating a wireless communication system configured in accordance with a first embodiment of the present invention.

| DESCRIPTION OF REFERENCE NUMERALS | | |
|---|---|---|
| 10 | | Base station (BS: sending station) |
| 101 | | Network (NW) interface |
| 102 | | Packet identifier |
| 103 | | Packet buffer |
| 104 | | PDU generator |
| 141 | | Fragmentation/packing determiner |
| 142 | | SDU fragmenting unit |
| 143 | | FSN/FC assigner |
| 144 | | SDU buffer |
| 145 | | Header assigner |
| 105 | | FSN management table storage unit |
| 106 | | Transmission controller |
| 107 | | Encoder |
| 108 | | Modulator |
| 109 | | Transmitter |
| 110 | | Duplexer |
| 111 | | Transmitter-receiver antenna |
| 112 | | Receiver |
| 113 | | Demodulator |
| 114 | | Decoder |
| 115 | | SDU regenerator |
| 20 | | Relay station (RS) |
| 201 | | PDU buffer |
| 202, 214 | | PDU reconstructor |
| 221 | | PDU length determiner |
| 222, 226 | | SDU extractor |
| 223 | | SDU fragmenting unit |
| 224 | | PDU generator |
| 225 | | FSN assigner |
| 227 | | Packed-SDU fragmenting unit |
| 228 | | Header assigner |
| 229 | | Selector |
| 203 | | FSN management table storage unit |
| 204 | | Transmission controller |
| 205 | | Encoder |
| 206 | | Modulator |
| 207 | | Transmitter |
| 208 | | Duplexer |
| 209 | | Transmitter-receiver antenna |
| 210 | | Receiver |
| 211 | | Demodulator |
| 212 | | Decoder |
| 213 | | PDU receiver |
| 30 | | Mobile station (MS: receiving station) |

BEST MODE FOR CARRYING OUT THE INVENTION

Embodiments of the present invention will be described herein after with reference to the drawings. However, the invention is not to be limited to the following embodiments. Obviously further modifications can be implemented without departing from the scope of the invention upon the reading and understanding of this specification. All such modifications are intended to be included within the scope of the invention.

[A] Summarized Description

To solve the above-described problems, embodiments of the present invention adopt the following schemes described in (1) and (2):

(1) A relay station (RS), in further fragmenting a packet already fragmented, assigns a new FSN (Fragment Sequence Number) to the packet further fragmented.

(2) Alternatively, a packet sending station (e.g., a radio base station) fragments a packet into small blocks beforehand, and adds a sequence number to each block beforehand. In addition, in order to reduce the overhead, the fragmented blocks are packed and transferred. When further fragmentation is needed in the relay station (RS), the packed packet is separated into the blocks fragmented in the sending station. Because each block already has its sequence number, the relay station (RS) does not need to add a new sequence number.

A specific example of the former (1) will herein after be described in detail as a first embodiment, while a specific example of the latter (2) will herein after be described in detail as a second embodiment.

[B] Description of First Embodiment

FIG. 1 is a block diagram illustrating a wireless communication system according to a first embodiment of the present invention. The system illustrated in the figure is equipped with a radio base station (BS) 10, a radio terminal (mobile station (MS)) 30, and a relay station (RS) 20 deployed between the BS 10 and the MS 30 to relay the transmission of information between the BS 10 and the MS 30. The MS 30 is configured such that it can communicate with the BS 10 directly or through the RS 20. In the downlink communication from the BS 10 to the MS 30, the BS functions as a sending station and the MS 30 as a receiving station.

The RS 20, as its major functions, includes a PDU buffer 201, a PDU reconstructor 202, an FSN management table storage unit 203, a transmission controller 204, an encoder 205, a modulator 206, a transmitter 207, a duplexer 208, a transmitter-receiver antenna 209, a receiver 210, a demodulator 211, a decoder 212, and a PDU receiver 213.

The PDU buffer (packet buffer) 201 is adapted to temporarily hold a packet normally received from the BS 10 or MS 30, i.e., an MAC-PDU (sometimes simply called a PDU herein after) until the next transmission chance.

The PDU reconstructor (packet fragmenting unit) 202, under control of the transmission controller 204, is adapted to determine whether to fragment the MAC-SDU (sometimes simply called a SDU herein after) of an MAC-PDU transferred from the PDU buffer 201 on the basis of a predetermined reference (described later), selectively further fragment (refragment) the MAC-SDU according to the determination result, and reconstruct an MAC-PDU from the fragmented MAC-SDUs or a nonfragmented MAC-SDU. In this embodiment, the PDU reconstructor 202 is equipped with the following functions (1) and (2).

(1) First function of assigning (reassigning) a fragment sequence number (FSN) to each of the fragmented MAC-SDUs and nonfragmented MAC-SDUs that are of the same connection irrespective of whether to fragment (refragment), based on FSNs managed according to CID (connection identifier) by the FSN management table storage unit 203

(2) Second function of assigning (reassigning) a new FC value (FC bits) to a fragmented MAC-SDU according to a rule described later Owing to having these functions, the RS 20 of this embodiment is capable of preventing a conflict of FSNs from occurring between a fragmented MAC-SDU and a nonfragmented MAC-SDU, and also capable of maintaining the match of FC values before and after fragmentation. In other words, the PDU reconstructor 202 reassigns FSNs to a fragmented MAC-SDU and a nonfragmented MAC-SDU as identification information, and also reassigns control information that indicates which part of the original packet a fragment of the packet (fragmented in the BS 10) belongs to, with the FC-value match being maintained.

The FSN management table storage unit (sequence number manager) 203, for example, as illustrated in the following Table 2, is adapted to store and manage in memory (not illustrated) an FSN (Next FSN) that is next added to an MAC-SDU, in the form of table data (FSN management table), according to the connection identifier (CID) belonging to an MAC-PDU to be transmitted. Note that the "Next FSN" is updated by being incremented by 1 every time an FSN is added to an MAC-SDU.

TABLE 2

FSN Management Table

| CID | Next FSN |
|---|---|
| #1 | 0 |
| #2 | 31 |
| . | . |
| . | . |
| . | . |
| #N | 23 |

The transmission controller 204 is adapted to control a PDU reconstruction process (fragmentation of SDU, addition of FSN, addition of FC, and so on) that is carried out in the PDU reconstructor 202. At PDU transmission timing, the controller 204 is adapted to extract a PDU from the PDU buffer 201 and transfer it to the PDU reconstructor 202. The PDU transmission timing is decided by a scheduler (not illustrated) of the RS 20 (transmission controller 204) so that QoS (Quality of Service) is guaranteed, or the PDU transmission timing in the RS 20 is decided by the BS 10. Based on the transmission timing information, the PDU transmission timing can be decided.

In addition, the transmission controller 204 is adapted to trigger the PDU reconstructor 202 with respect to the transmission of PDUs, and also has a function of specifying a transmittable PDU length or number of bytes. A data quantity, such as a PDU length or number of bytes, which is transmittable (transmittable size) can be decided based on available radio resources (the number of subchannels, number of symbols, and such), and on the modulation method and encoding rate being used. Therefore, in systems adopting adaptive coding modulation, a data quantity, such as a PDU length or number of bytes, which is transmittable can also be adaptively decided based on feedback information on the radio reception quality from the MS 30 such as CQI, CINR, or the like.

The encoder 205 is used for adding to the PDU from the PDU reconstructor 202 the required error correction codes such as turbo codes etc. The modulator 206 is used for modulating the coded data from the encoder 205 by employing the required modulation method such as QPSK, 16QAM, or the like. The transmitter 207 is used for performing on the modulated signal from the modulator 206 the required wireless transmission process that includes DA conversion, frequency conversion to radio frequency (RF) (up-conversion), amplification to the required transmitting power by a high-output amplifier, and so forth.

The duplexer 208 is used for separating an outgoing signal and an incoming signal, and is adapted to output the outgoing signal from the transmitter 207 to the transmitter-receiver antenna 209, and output the incoming signal from the transmitter-receiver antenna 209 to the receiver 210.

The transmitter-receiver antenna (also sometimes simply called an antenna herein after) 209 is used for radiating the outgoing signal from the duplexer 208 into space toward the MS 30 or BS 10, and receiving a signal radiated into space from the MS 30 or BS 10.

Thus, the above-mentioned encoder 205, modulator 206, transmitter 207, duplexer 208, and transmitter-receiver antenna 209 as a whole function as packet transmitting unit for transmitting to the MS 30 (which is a receiving station) the fragmented SDU and nonfragmented SDU to which, as described previously, new FSNs and FCs have been added in the PDU reconstructor 202.

On the other hand, the receiver 210 is used for performing the required wireless reception process, which includes amplification by a low noise amplifier, frequency conversion to base band frequency (down-conversion), AD conversion, etc., on an incoming signal that is received by the antenna 209 and input from the duplexer 208. The demodulator 211 is used for demodulating the incoming signal on which the aforementioned wireless reception process has been performed in the receiver 210, by a demodulation method that corresponds to the modulation method at the sending side (MS 30 or BS 10).

The decoder 212 is used for decoding the incoming signal demodulated in the demodulator 211, by a decoding method and decoding rate that correspond to the encoding method and encoding rate at the aforementioned sending side. The PDU receiver 213 has a function of identifying information on QoS from the decoded data sent from the decoder 212, for example from the CID added to the GMH of the PDU, and temporarily storing a received signal in the PDU buffer 201 according to that information, and a function of computing a cyclic redundancy check (CRC) over the aforementioned decoded data. Note that when an error is detected from the computation result, it is also possible for the transmission controller 204 to perform retransmission control such as HARQ etc.

Thus, the above-mentioned antenna 209, duplexer 208, receiver 210, demodulator 211, decoder 212, and PDU receiver 213 as a whole function as packet receiver for receiving the packet fragmented in the BS 10.

(Detailed Description of PDU Reconstructor 202)

Figure 2:
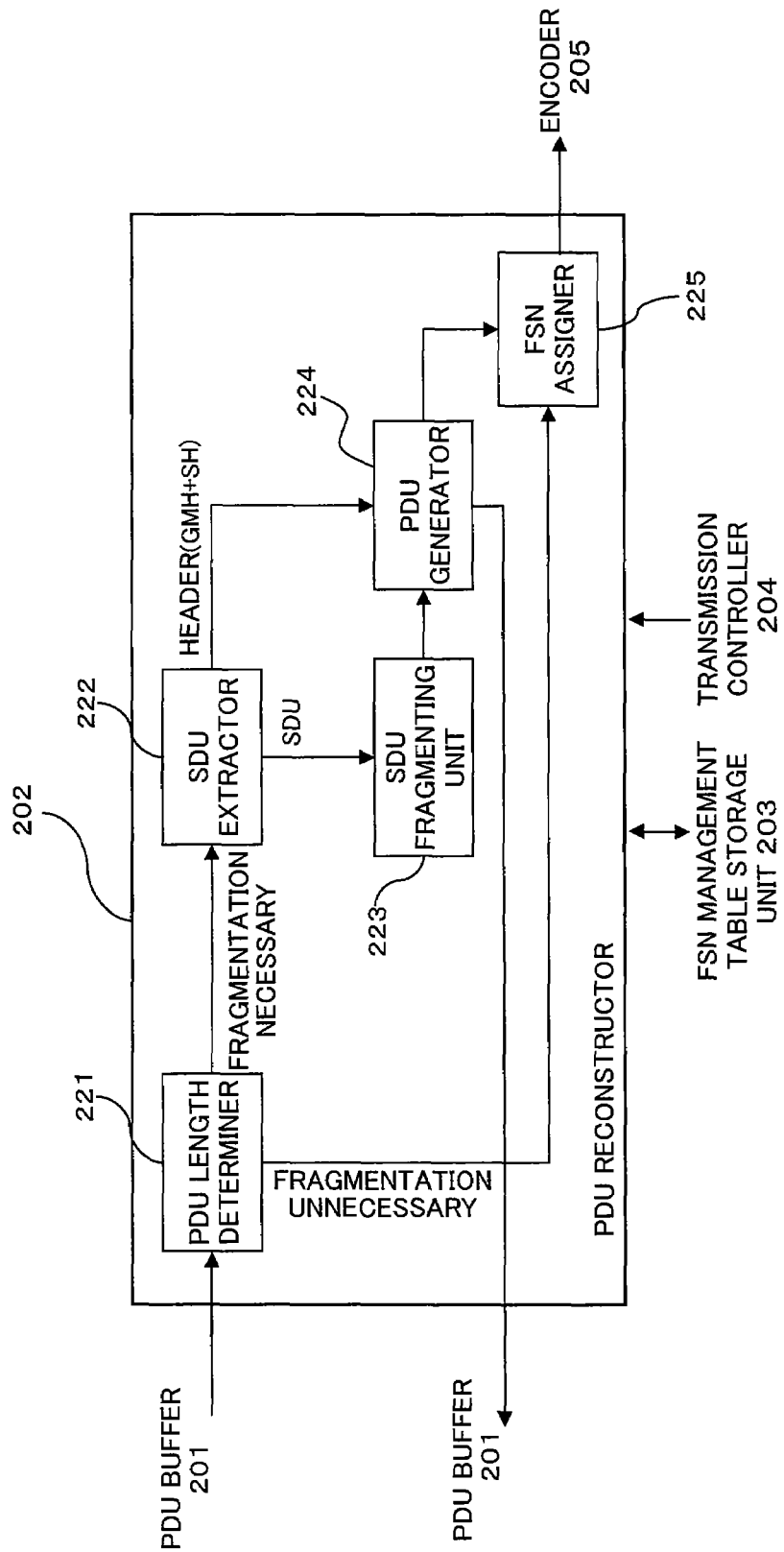
FIG. 2 is a block diagram illustrating the configuration of a PDU reconstructor in the relay station (RS) illustrated in FIG. 1.

The configuration of the above-mentioned PDU reconstructor 202 is illustrated in FIG. 2 by way of example. As illustrated in the figure, the PDU reconstructor 202, in order to implement the functions previously described, includes a PDU length determiner 221, an SDU extractor 222, an SDU fragmenting unit 223, a PDU generator 224, and an FSN assigner 225.

The PDU length determiner (fragmentation determiner) 221, on receiving an MAC-PDU from the PDU buffer 201 at the aforementioned PDU transmission timing, is adapted to determine whether the MAC-PDU is transmittable without being fragmented (i.e., whether a packet size to be transmitted exceeds a transmittable size), based on the data quantity such as a PDU length or number of bytes, which is transmittable (transmittable size), specified by the transmission controller 204. The PDU length determiner 221 is adapted to transfer the PDU to the FSN assigner 225 if it is transmittable (fragmentation unnecessary) at that time, and to the SDU extractor 222 if it is not transmittable (fragmentation necessary).

The SDU extractor 222 is used to separate the PDU, which was judged to be "Fragmentation necessary" and transferred from the PDU length determiner 221, into the header (GMH and subheader) and the SDU stored in the payload, transfer the SDU to the SDU fragmenting unit 223, and transfer the header to the PDU generator 224.

The SDU fragmenting unit (packet refragmenting unit) 223 is used to fragment the SDU from the SDU extractor 222 into pieces so that each piece becomes equal to the data quantity specified by the transmission control 204, allowing for the header being added by the PDU generator 224. The fragmented SDU is transferred from the SDU fragmenting unit 223 to the PDU generator 224.

The PDU generator 224 is used to add the headers (including subheaders) to the fragmented SDUs to generate (reconstruct) a plurality of PDUs. The PDUs that are transmittable are transferred to the FSN assigner 225, while the PDUs not transmittable are transferred to the PDU buffer 201.

The SDU fragmenting unit 223 also has a function of updating (replacing) the FC that is contained in the fragmentation subheader. For instance, in the case of fragmenting an SDU into two, as illustrated in the following Table 3, new FC values are added to the two fragmented SDUs, a first fragment and a subsequent fragment, according to the original FC value.

TABLE 3

FC Updating Pattern

| Original FC | FC after fragmentation | |
| --- | --- | --- |
| | First fragment | Subsequent fragment |
| 00: No fragment | 10: First fragment | 01: Last fragment |
| 01: Last fragment | 11: Middle fragment | 01: Last fragment |
| 10: First fragment | 10: First fragment | 11: Middle fragment |
| 11: Middle fragment | 11: Middle fragment | 11: Middle fragment |

More particularly, when the FC value of an SDU before being fragmented is 00 which means "No Fragment", the first fragment of the two fragmented SDUs is assigned FC=10 which means a first fragment, while the subsequent fragment is assigned FC=01 which means a last fragment. When the FC value of an SDU before being fragmented is 01 which means "Last Fragment", the first fragment of the two fragmented SDUs is assigned FC=11 which means a middle fragment, while the subsequent fragment is assigned FC=01 which means a last fragment.

Likewise, when the FC value of an SDU before being fragmented is 10 which means "First Fragment", the first fragment of the two fragmented SDUs is assigned FC=10 which means a first fragment, while the subsequent fragment is assigned FC=11 which means a middle fragment. When the FC value of an SDU before being fragmented is 11 which means "Middle Fragment", each of the two fragmented SDUs is assigned FC=11 which means a middle fragment.

Note that the FC-value converting rule illustrated in Table 3 is stored in the form of a table in the SDU fragmenting unit 223, or memory not illustrated of the transmission controller 204.

Thus, the SDU fragmenting unit 223, singly or in cooperation with the transmission controller 204, functions as controller which, based on the FC value of the original SDU before being fragmented, adds (or assigning) to a fragmented SDU a new FC value which matches the original FC value.

By adding (or assigning) new FCs, it becomes possible to assure the match between FC values of an SDU before and after being fragmented, so that the receiving station (MS 30 in the downlink communication or BS 10 in the uplink communication) is capable of packing and reconstructing (restoring) fragmented SDUs in right combination, based on the aforementioned FSNs and FC values. Thus, FSNs and FCs are information that is added according to fragmentation, and serve as information that is used to restore the original packet.

Finally, the FSN assigner (sequence number assigner) 225 is adapted to add an FSN to a PDU (which is to be transferred) by referring to the FSN management table (see Table 2) stored on the FSN management table storage unit 203, increment the next FSN ("Next FSN") of the connection identifier (CID) related to the PDU to update the FSN management table, add a CRC as occasion demands, and transfer the processed PDU to the encoder 205.

Thus, the above-mentioned FSN management table storage unit 203, transmission controller 204, and FSN assigner 225 as a whole function as controller of adding FSNs to fragmented SDUs and nonfragmented SDUs as identification information, respectively.

(Description of Operation of RS 20)

Figure 3:
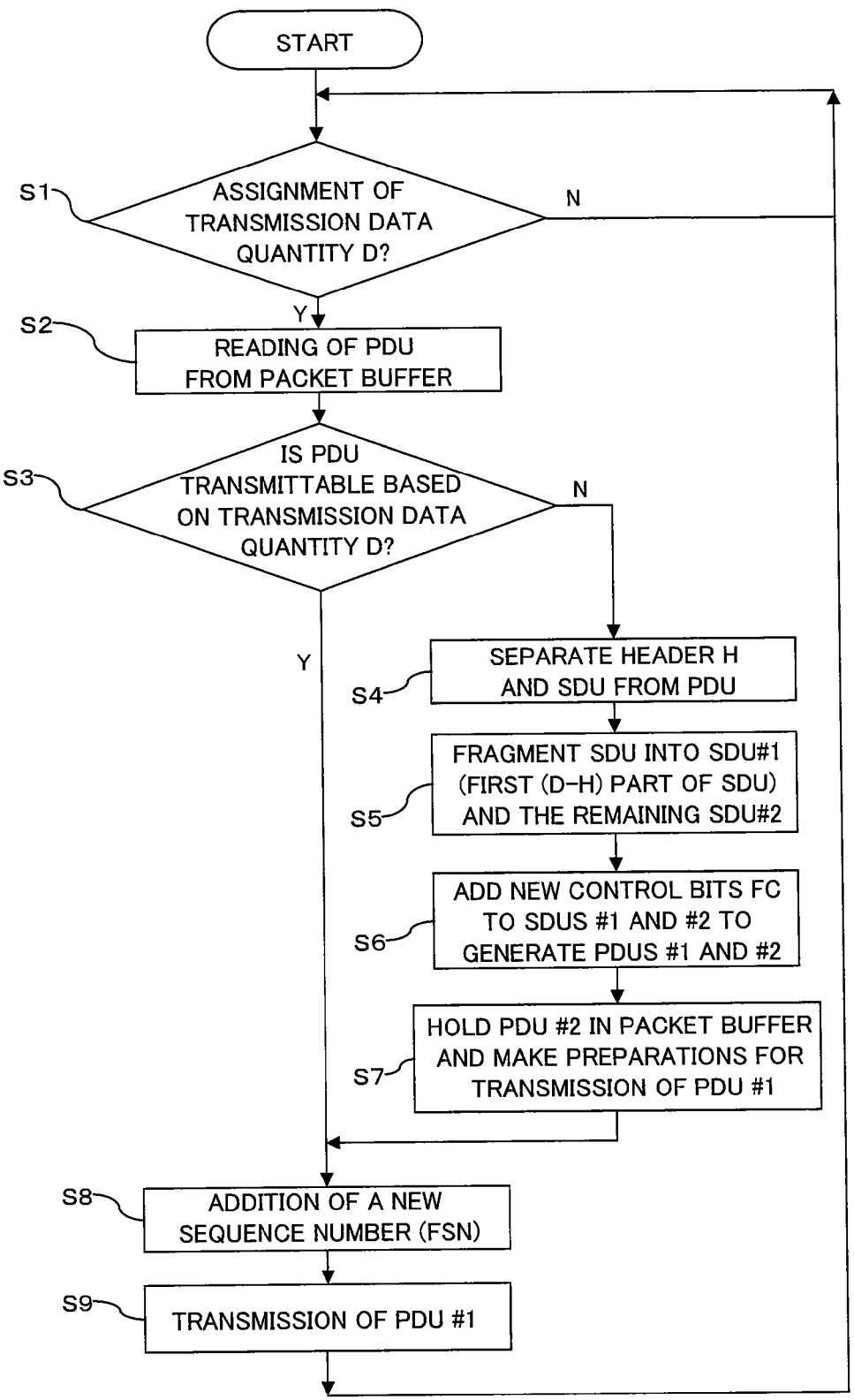
FIG. 3 is a flowchart used for explaining operation of the RS illustrated in FIGS. 1 and 2.

The operation of the RS 20 of this embodiment configured as described above will be described in detail herein after with reference to a flowchart illustrated in FIG. 3.

In the RS 20, the transmission controller 204 checks whether a transmission data quantity D has been assigned (i.e., whether the packet fragmenting function has been effectively set) (route N of step S1). If it has been assigned, a PDU to be transmitted is read out from the PDU buffer 201 at the aforementioned PDU transmission timing and transferred to the PDU reconstructor 202 (route Y of step S1 to Step S2).

In the PDU reconstructor 202, on receiving the PDU from the PDU buffer 201, the PDU length determiner 221 determines, based on the specified data quantity D from the transmission controller 204, whether the PDU is transmittable without being fragmented (step S3).

As a consequence, if it is not transmittable (i.e., if fragmentation is necessary) (route N of step S3), the PDU length determiner 221 transfers the PDU to the SDU extractor 222. The SDU extractor 222 separates the PDU into the header (GMH and subheader) (where H is the size of the header) and the SDU stored in the payload, and transfers the SDU to the SDU fragmenting unit 223 and the header to the PDU generator 224 (step S4).

The SDU fragmenting unit 223 fragments the SDU from the SDU extractor 222 into an SDU #1 corresponding to the first portion (D-H) of the SDU and the remaining SDU #2, and transfers them to the PDU generator 224.

The PDU generator 224 adds the headers (size H) to the SDU #1 and SDU #2 transferred from the SDU fragmenting unit 223 and updates (or replaces) the FC bits contained in the fragmentation subheaders with new FC bits according to the rule illustrated in Table 3, thereby generating (reconstructing) PDUs #1 and #2 (step S6). The PDU transmittable (e.g., PDU #1) is transferred the FSN assigner 225, while the PDU not transmittable (e.g., PDU #2) is transferred to the PDU buffer 21 (step S7).

On the other hand, when it is determined in step S3 that the PDU is transmittable ("Fragmentation Unnecessary"), the PDU length determiner 221 transfers that PDU to the FSN assigner 225 (route Y of step S3).

The FSN assigner 225 then adds new FSNs managed in the FSN management table to the fragmented PDU from the PDU generator 224 and the nonfragmented PDU from the PDU length determiner 221 (step S8), and transfers them to the encoder 205.

In this way, the transmittable PDU of the SDU fragmented in the SDU fragmenting unit 223, or transmittable nonfragmented PDU, undergoes the required error correction encoding process, modulation process, and wireless transmission process by passing through the encoder 205, modulator 206, and transmitter 207, and then the PDU is transmitted from the antenna 209 toward the receiving station (MS 3 (sic) in the downlink communication) (step S9).

A signal received by the antenna 209 undergoes the required wireless reception process, demodulation process, decoding process, CRC-computation process, and other processes by passing through the duplexer 208, receiver 210, demodulator 211, decoder 212, and PDU receiver 213, and is temporarily held in the PDU buffer 201 until the transmission timing that is specified by the transmission controller 204.

As described supra, in accordance with the present embodiment, in the RS 20, regardless of whether to fragment (refragment) a received packet, the sequence number of each packet is replaced with a new sequence number, so that a malfunction due to a conflict of FSNs in the MS 30 can be prevented. Therefore, it becomes possible for the RS 20 to fragment a received packet freely (flexibly) and transmit (relay) it to the BS 30, according to radio resources such as radio bands available between the RS 20 and the MS 30. Thus, it becomes possible to utilize radio resources.

Figures 14A, 14B:
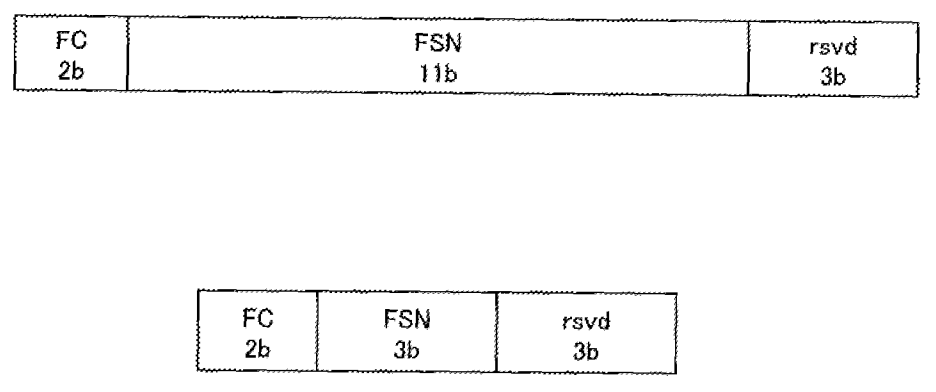

While it has been described in the first embodiment that a new sequence number is added to the FSN field of a fragmentation subheader (see FIGS. 14(*a*) and 14(*b*)) to avoid a conflict of FSNs, it is also possible to implement the same FSN conflict preventing function, for example, by adding identification information such as an additional sequence number to the reserved field (3 bits) with the received FSN field remaining unchanged.

[C] Description of Second Embodiment

It will be described in this embodiment that as to the downlink communication to the MS 30 (or in the uplink communication to the BS 10), in the BS 10, by previously fragmenting the SDU in a PDU into small SDUs of size equivalent to the length of the SDU fragmented in the first embodiment, then adding FSNs to the fragments, and packing them and transmitting to the RS 20, the addition of new FSNs resulting from further fragmentation (FSN management in the RS 20) is not needed in the RS 20.

(Description of Packing)

First of all, a description will be given of the "packing" function defined in the aforementioned nonpatent document 1.

According to the nonpatent document 1, packing subheaders are respectively added to a plurality of SDUs (including fragmented SDUs), and then they are packed and assigned a single GMH (Generic MAC Header). This can reduce the overhead bits due to the single GMH, compared with the case where GMHs are respectively added to SDUs.

Figure 4:
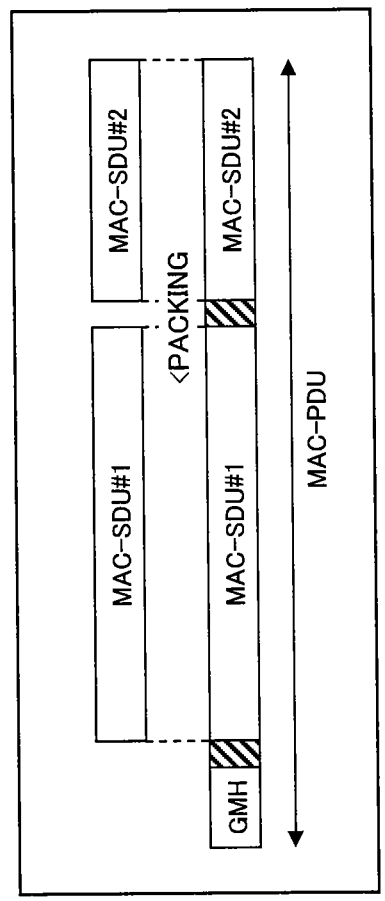
FIG. 4 is a packet format diagram used for explaining the packing of packets according to a second embodiment of the present invention.

The packing subheader, in transmitting a plurality of SDUs as a single PDU, is employed to add to each SDU a sequence number, control bits representing the location of the fragment, and the SDU length. An example of packing is depicted in FIG. 4. In the figure, while a packing subheader, which is illustrated by shaded area, is added to two SDUs #1 and #2 respectively, a single GMH common to the two is added, whereby a single PDU is constructed. As evident from the fact that SDUs to be packed have a GMH in common, only SDUs of the same connection identifier (CID) can be packed into the same PDU.

As to the format of the packing subheader, as with the format of the fragmentation subheader, for instance, in the case where an ARQ (Automatic Repeat Request) is disabled, two alternative patterns are prepared according to connection type:

(a) ARQ-disabled and Extended-Type Connection
(b) ARQ-disabled and non-Extended-Type Connection The two alternative packing subheader patterns are illustrated in FIGS. 5(*a*) and 5(*b*), respectively. The former pattern, as illustrated in FIG. 5A, has an FC (Fragmentation Control) field (two bits), an FSN (Fragment Sequence Number) field (11 bits) in which a sequence number is added to each fragmented MAC-SDU, and an SDU length field (11 bits) which represents the length of a packed SDU (including the subheader) in bytes. On the other hand, the latter format, as illustrated in FIG. 5(*b*), has an FC field (2 bits), an FSN field (3 bits), an SDU length field (11 bits)

Each field in the packing subheader format is explained in the following Table 4.

TABLE 4

Packing Subheader Format

| Field name | Description |
|---|---|
| FC(Fragment Control) | 00: No fragment<br>01: Last fragment<br>10: First fragment<br>11: Middle fragment |
| Length | SDU length (in bytes) including packing subheader |
| FSN(Fragment Sequence Number) | The sequence number of SDU fragment |

The FC field is a fragmentation control field representing the location of a fragmented SDU (fragment) FC=00 represents that this SDU is not a fragment, FC=01 represents the last fragment of the fragmented SDUs, FC=10 represents the first fragment of the fragmented SDUs, and FC=11 represents the middle fragment of the fragmented SDUs. The FSN field represents a sequence number that is incremented one by one in a series of fragmented SDUs. The reason why the packing header contains the FC bits is that fragmentation and packing are sometimes performed at the same time.

As illustrated in FIGS. 5(*a*) and 5(*b*), the packing subheader further contains information on SDU length in addition to the fragmentation subheader. Therefore, the sending station (BS 10 in the downlink communication) fragments an SDU into small SDUs and packs them, and sends the packed SDU to the RS 20 as a single PDU. In this manner, when it is necessary to fragment the received PDU, the fragmentation in the RS 20 is limited to the unit of the length of the SDU fragmented in the BS 10, but the addition of new sequence numbers, updating of FC bits, etc. are not needed in the RS 20, as they are done in the first embodiment. This makes it possible to lighten the processing workload in the RS 20.

In the following description, attention is directed to the transmission of packets from the BS 10 to RS 20 and from RS 20 to the MS 30 (downlink). Note that as to an uplink which is the inverse of a downlink, packet fragmentation and packing can be similarly implemented by the same operation as the following operation. Note also that in the following description, parts given the same reference numerals as the aforementioned reference numerals denote the same parts as the aforementioned parts or corresponding parts, unless otherwise specified.

(Description of BS 10)

Figure 6:
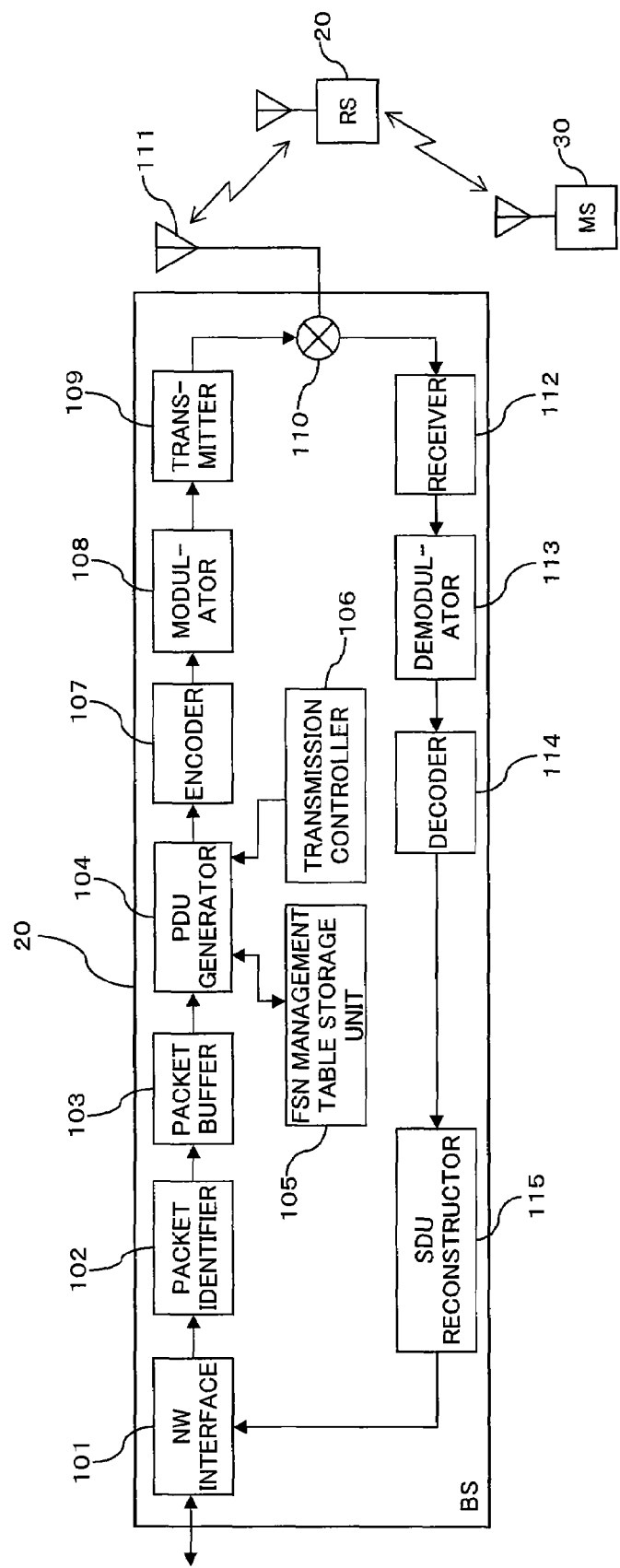
FIG. 6 is a block diagram illustrating a wireless communication system configured in accordance with the second embodiment.

FIG. 6 is a block diagram illustrating the configuration of a wireless communication system according to a second embodiment of the present invention. In the wireless communication system illustrated in FIG. 6, the BS 10 includes, as its major functions, a network (NW) interface 101, a packet identifier 102, a packet buffer 103, a PDU generator 104, an FSN management table storage unit 105, a transmission controller 106, an encoder 107, a modulator 108, a transmitter 109, a duplexer 110, a transmitter-receiver antenna 111, a receiver 112, a demodulator 113, a decoder 114, and an SDU regenerator 115.

The NW interface 101 is used to interface with a higher network. The buffer identifier 102 is used to identify a destination (MS 30) and a QoS class based on information such as the IP header of the received packet from the NW interface 101, etc., and temporarily hold the received packet in the packet buffer 103 according to the identify destination (MS 30) or connection identifier (CID) which corresponds to the QoS class.

The packet buffer 103, as described above, is used to temporarily hold a received packet according to the CID until transmission timing that is instructed from the transmission controller 106. The PDU generator 104 is used to generate a PDU from the packets transferred from the packet buffer 103, under control of the transmission controller 106. In this embodiment, the PDU generator 104 is adapted to (1) determine whether transmit the packet from the packet buffer 103 which is fragmented and/or packed, (2) fragment the SDU into a plurality of blocks (small SDUs) if fragmentation is necessary, and (3) pack the small SDUs after FSNs and FCs are respectively added to them. This size of the SDU fragmented in the PDU generator 104 is used as a unit of fragmentation (separation) when further fragmentation is required in the RS 20.

The FSN management table storage unit 105, as with the FSN management table storage unit 203 in the RS 20 previously described, is used to manage in the form of table data (an FSN management table) an FSN (Next FSN) that is next added to a SDU, according to the connection identifier (CID) belonging to a PDU to be transmitted. Note that the "Next FSN" is updated by being increased by 1 each time an FSN is added to a SDU.

The transmission controller 106 has the same function as the transmission controller 204 in the RS 20 previously described. That is to say, the transmission controller 106 has the function of extracting a packet from the PDU buffer 103 at the PDU transmission timing and transferring it to the PDU generator 104. The PDU transmission timing, as with the first embodiment, is decided, for example, by a scheduler (not illustrated) of the BS 10 so that QoS (Quality of Service) is guaranteed.

The transmission controller 106 is also adapted to trigger the PDU generator 104 with respect to transmission of PDUs, and has a function of specifying a transmittable PDU length or number of bytes. As with the first embodiment, a data quantity, such as a PDU length or number of bytes, which is transmittable can be decided based on available radio resources (the number of subchannels, number of symbols, and such), and on the modulation method and encoding rate being used. Therefore, in systems adopting adaptive coding modulation, a data quantity, such as a PDU length or number of bytes, which is transmittable can also be adaptively decided based on feedback information on the radio reception quality from the MS 30 such as CQI, CINR, or the like.

The encoder 107 is used to add to the PDU from the PDU generator 104 the required error correction codes such as turbo codes etc. The modulator 108 is used to modulate the coded data from the encoder 107 using the required modulation method such as QPSK, 16QAM, or the like. The transmitter 109 is used to perform on the modulated signal from the modulator 108 the required wireless transmission process that includes DA conversion, frequency conversion to radio frequency (RF) (up-conversion), amplification to the required transmitting power by a high-output amplifier, and so forth.

The duplexer 110 is used to separate an outgoing signal and an incoming signal, and is adapted to output the outgoing signal from the transmitter 109 to the transmitter-receiver antenna 111, and output the incoming signal from the transmitter-receiver antenna 111 to the receiver 112.

The transmitter-receiver antenna (also sometimes simply called an antenna herein after) 111 is used to radiate the outgoing signal from the duplexer 110 into space toward the MS 30 or RS 20, and receive a signal radiated into space from the MS 30 or RS 20.

Thus, the above-mentioned encoder 107, modulator 108, transmitter 109, duplexer 110, and antenna 111 as a whole function as packet transmitting unit for transmitting to the RS 20 the PDU that has been generated in the PDU generator 104 by packing the aforementioned fragmented SDUs after adding an FSN to each of the SDUs.

On the other hand, the receiver 112 is used for performing the required wireless reception process, which includes amplification by a low noise amplifier, frequency conversion to base band frequency (down-conversion), AD conversion, etc., on an incoming signal that is received by the antenna 111 and input from the duplexer 110. The demodulator 113 is used for demodulating the incoming signal, on which the aforementioned wireless reception process has been performed in the receiver 112, by a demodulation method that corresponds to the modulation method at the sending side (MS 30 or RS 20).

The decoder 114 is used to decode the incoming signal demodulated in the demodulator 113, by a decoding method and decoding rate that correspond to the encoding method and encoding rate at the aforementioned sending side. The SDU regenerator 115 has a function of identifying information on QoS from the decoded data sent from the decoder 115, for example from the CID added to the GMH of the PDU, and regenerating an IP packet etc. according to that information. Note that the SDU regenerator 115 can also have a function of computing a cyclic redundancy check (CRC) over the aforementioned decoded data. When an error is detected from the computation result, it is also possible for the transmission controller 106 to perform retransmission control such as HARQ etc.

(Detailed Description of PDU Generator 104)

Figure 7:
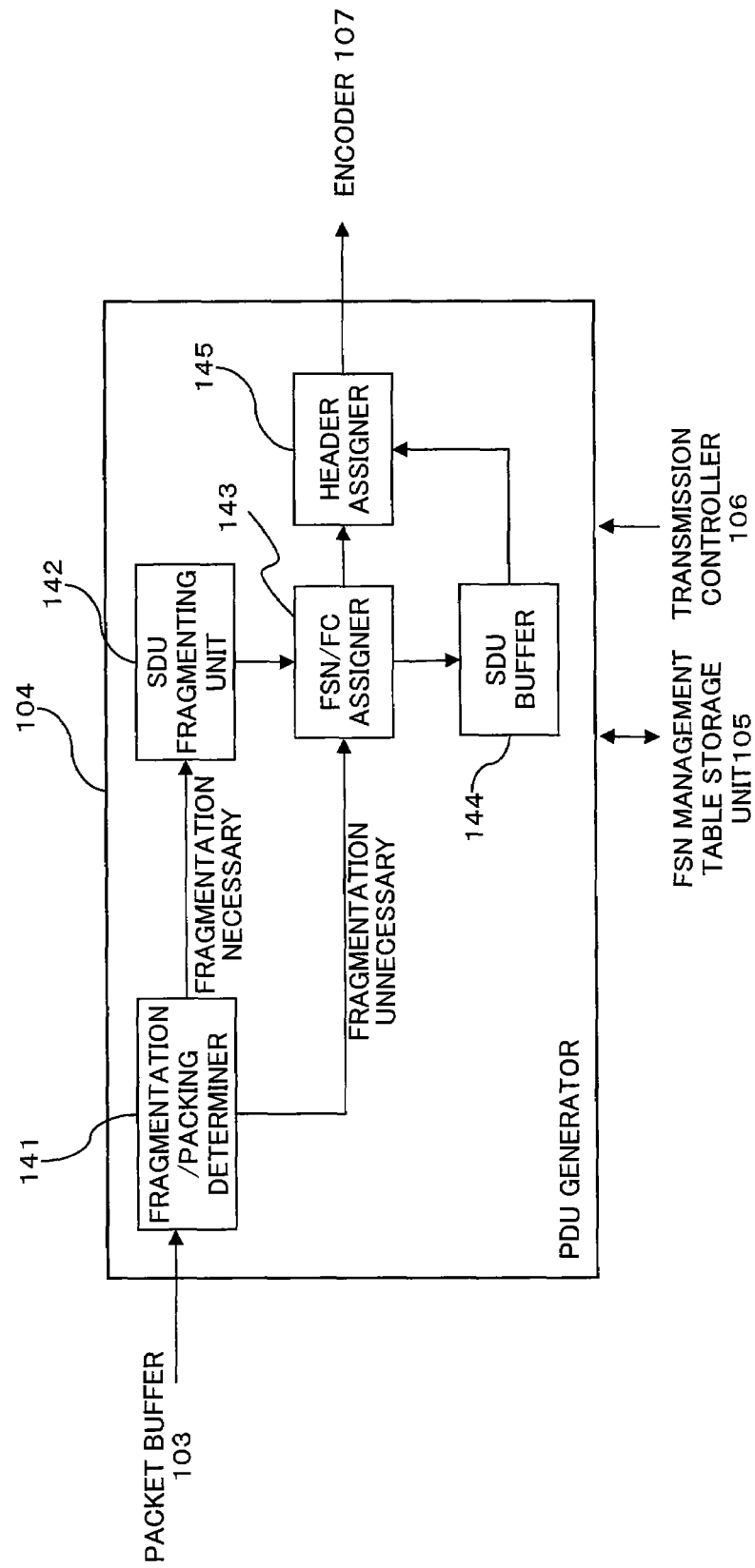
FIG. 7 is a block diagram illustrating the configuration of a PDU generator in the base station (BS) illustrated in FIG. 6.

The configuration of the above-mentioned PDU generator 104 is illustrated in FIG. 7 by way of example. As illustrated in the figure, the PDU generator 104, in order to implement the functions previously described, includes a fragmentation/packing determiner 141, an SDU fragmenting unit 142, an FSN/FC assigner 143, an SDU buffer 144, and an FSN assigner 145.

The fragmentation/packing determiner 141 is used to determine whether the packet from the packet buffer 103 is fragmented, or transmitted as a packed PDU. The fragmentation/packing determiner 141 is adapted to transfer the packet to the FSN/FC assigner 143 if fragmentation is unnecessary and to the SDU fragmenting unit 142 if fragmentation is necessary. As to the determination of whether to fragment, for example, if the length of a packet exceeds a predetermined threshold value it can be determined that fragmentation is necessary, and in the case other than that, it can be determined that fragmentation is unnecessary. The threshold value may be a preset value, or a value informed by the RS 20. As to the packing, a plurality of packets (including fragmented SDUs) are packed within the range of a transmittable data quantity specified by the transmission controller 106.

The SDU fragmenting unit (packet fragmenting unit) 142 is used to fragment an SDU by using the above-mentioned threshold value as a reference, and transfer the fragmented SDUs to the FSN/FC assigner 143. The FSN/FC assigner 143 is used to generate and add to the fragmented SDU or non-fragmented SDU a subheader that contains the corresponding FC and an FSN that is incremented one by one in a series of fragmented SDUs. The SDU within the range of the transmittable data quantity is transferred to the header assigner 145, while the SDU outside the range is temporarily held in the SDU buffer 144 and waits until the next assignment of a transmittable data quantity.

The header assigner 145 is used to pack one SDU or a plurality of SDUs and add a header (GMH) to generate a PDU, and transfer the PDU to the encoder 107. Note that the SDUs that can be packed are only SDUs belonging to the same connection identifier (CID).

Thus, the FSN/FC assigner 143, in cooperation with the FSN management table storage unit 105 and transmission controller 106, functions as controller for adding to each of the fragmented SDUs an FSN which is identification information, while the header assigner 145 functions as packet packing unit for packing the fragmented SDUs to which the FSNs have been added.

(Description of Operation of BS 10)

Figure 10:
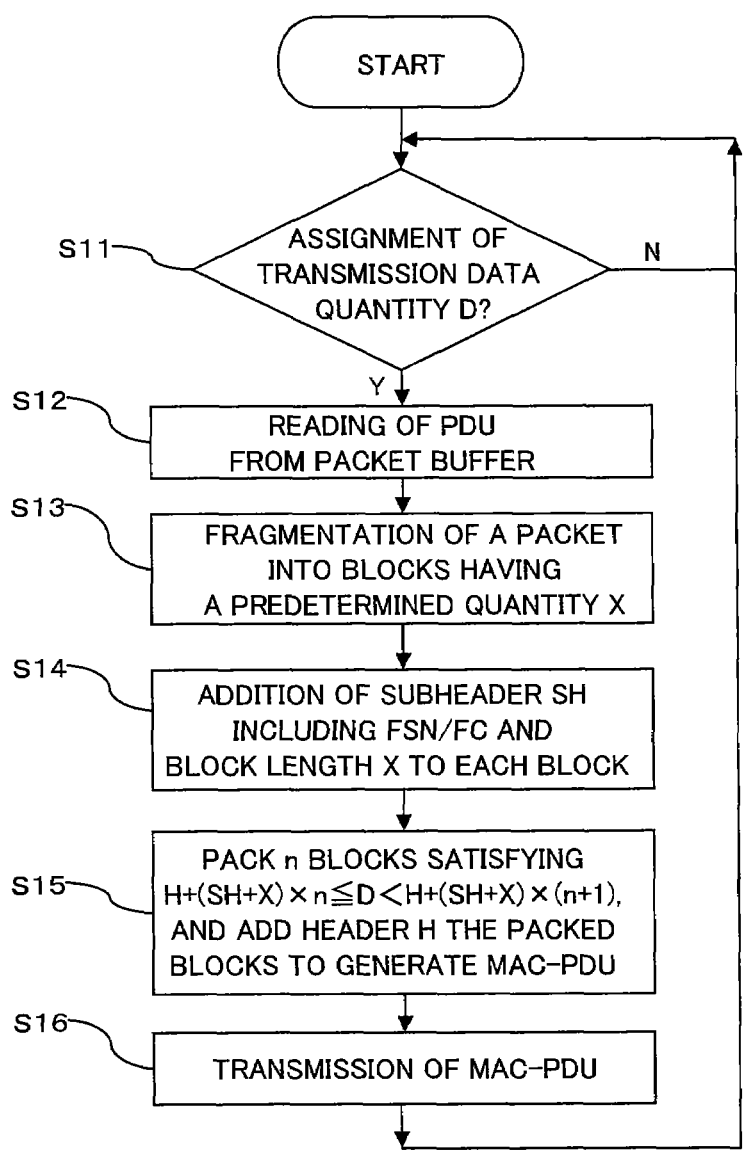
FIG. 10 is a flowchart used for explaining operation of the BS illustrated in FIGS. 6 and 7.

The operation of the BS 10 of this embodiment configured as described above will be described in detail herein after with reference to a flowchart illustrated in FIG. 10.

In the BS 10, the transmission controller 106 checks whether a transmission data quantity D has been assigned (i.e., whether the packet fragmenting/packing function has been effectively set) (route N of step S11). If it has been assigned, a packet to be transmitted is read out from the PDU buffer 103 at the aforementioned PDU transmission timing, and is transferred to the PDU generator 104 (route Y of step S11 to Step S12).

In the PDU generator 104, on receiving a packet from the packet buffer 103, the fragmentation/packing determiner 141 determines whether the packet (SDU) is fragmented, or transmitted as a packed PDU. That is, for instance, by comparing the packet length of the packet with the threshold value, if the packet length is above the threshold value it is determined that fragmentation is necessary, and in the case other than that, it is determined that fragmentation is unnecessary.

If fragmentation is unnecessary, the fragmentation/packing determiner 141 transfers the SDU to the FSN/FC assigner 143. If fragmentation is necessary, the fragmentation/packing determiner 141 transfers the SDU to the SDU fragmenting unit 142. The SDU fragmenting unit 142 fragments the SDU transferred from the fragmentation/packing determiner 141 into blocks that have a predetermined data quantity X (X<D) (step S13), and transfers the blocks to the FSN/FC assigner 143.

The FSN/FC assigner 143 generates and adds a subheader, which contains the corresponding FC, sequence number FSN, and the SDU length (block length), to the fragmented SDU from the SDU fragmenting unit 142 or nonfragmented SDU from the fragmentation/packing determiner 141 (step S14). The FSN/FC assigner 143 transfers to the header assigner 145 the SDU that is within the range of the transmittable data quantity D. The SDU which is outside the range of the data quantity D is temporarily held in the SDU buffer 144 and caused to wait until the next assignment of a transmittable data quantity.

The header assigner 145 packs a SDU or a plurality of SDUs transferred from the FSN/FC assigner 143 or SDU buffer 144 and adds a GMH to it to generate a PDU. More specifically, for example, if the length of the header GMH is represented by H and the length of the subheader by SH, n blocks (SDUs) satisfying $H+(SH+X) \times n \leq D < H+(SH+X) \times (n+1)$ are packed and assigned a GMH, whereby a PDU is generated (step S15).

The generated PDU is passed through the encoder 107, modulator 108, and transmitter 109, and is transmitted to the RS 20 or MS 30 through the antenna 111.

Note that a signal received by the antenna 111 is passed through the duplexer 110, receiver 112, demodulator 113, decoder 114, and SDU regenerator 115, whereby the received signal undergoes the required wireless reception process, demodulation process, decoding process, CRC-computation process, etc., and is then transferred to the NW interface 101.

Thus, the BS 10 fragments a SDU beforehand, adds an FSN to each of the fragmented SDUs, then packs them, and transmits a packed PDU to the RS 20. Therefore, in the RS 20, in the case where further fragmentation of a SDU is necessary, if the SDU is separated into the blocks fragmented in the BS 10, then the addition of FSNs in the RS 20 (FSN management in the RS 20) can be made unnecessary. The RS 20 will herein after be described in detail.

(Description of RS 20)

Figure 8:
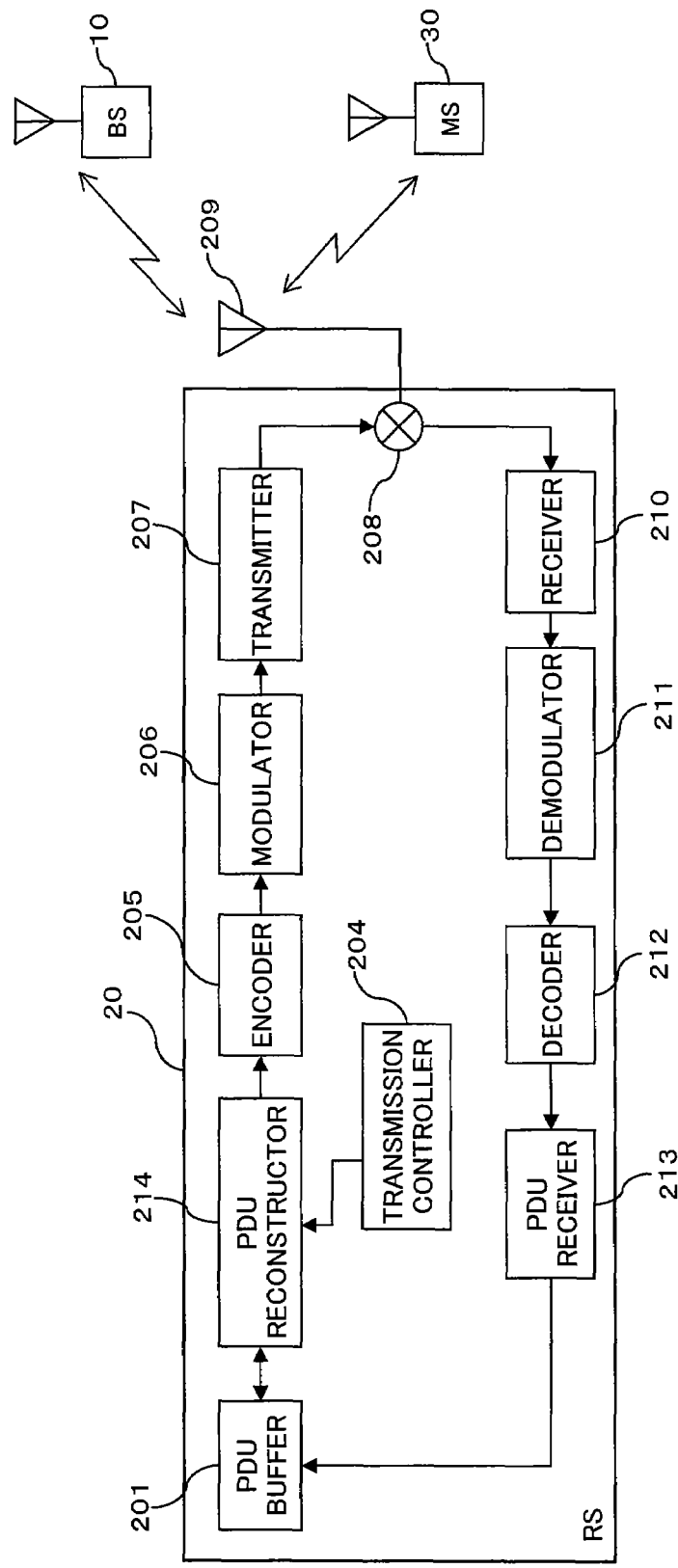
FIG. 8 is a block diagram illustrating the configuration of the relay station (RS) illustrated in FIG. 6.

FIG. 8 is a block diagram illustrating a specific configuration in which attention is directed to the major functions of the RS 20 in this embodiment. Since the above-mentioned fragmentation of an SDU, addition of FSN/FC, and packing of SDUs are performed in the BS 10, the RS 20 illustrated in FIG. 8 differs from the configuration of the RS 20 described in FIG. 1 in that the FSN management table storage unit 203 is unnecessary and the PDU reconstructor 202 is replaced with a PDU reconstructor 214. Note that in FIG. 8 and the following description, parts given the same reference numerals as the aforementioned reference numerals denote the same parts as the aforementioned parts or corresponding parts, unless otherwise specified.

For the PDU transmitted after undergoing the aforementioned fragmentation of an SDU, addition of FSN/FC, and packing of SDUs, or the PDU transmitted without undergoing these processes, the PDU reconstructor 214 is used to determine whether to fragment the PDU transferred from a PDU buffer 201 through a receiver 210, a demodulator 211, a decoder 212, and through a PDU receiver 213. If fragmentation is necessary, the PDU reconstructor 214 is adapted to fragment the PDU by separating the PDU into the blocks (SDUs) that have been fragmented in the BS 10.

(Detailed Description of PDU Reconstructor 214)

Figure 9:
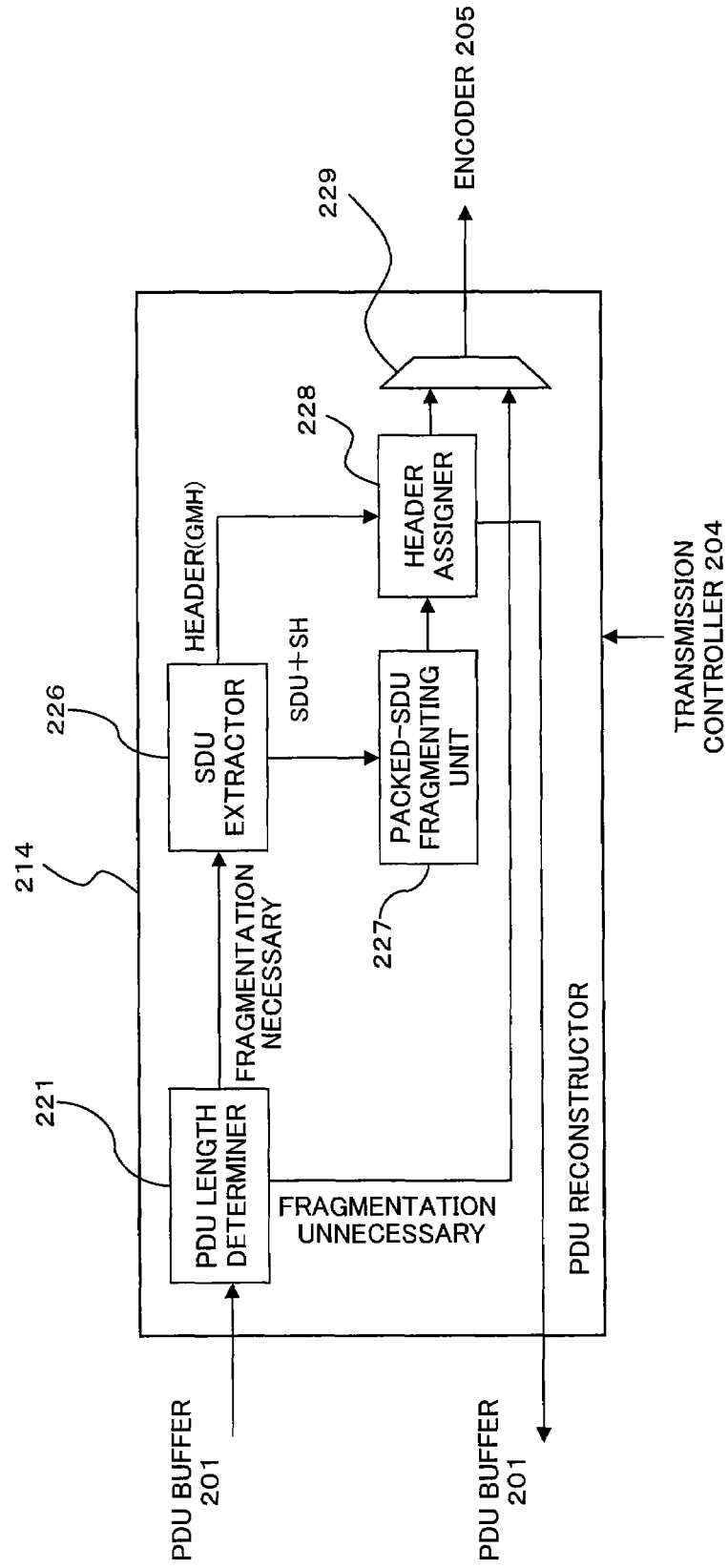
FIG. 9 is a block diagram illustrating the configuration of a PDU reconstructor in the relay station (RS) illustrated in FIG. 8.

For that purpose, for example, as illustrated in FIG. 9, the PDU reconstructor 214 of this embodiment includes, as its major functions, a PDU length determiner 221, an SDU extractor 226, a packed-SDU fragmenting unit 227, a header assigner 228, and a selector 229.

The PDU length determiner 221, on receiving an MAC-PDU from the PDU buffer 201 at the aforementioned PDU transmission timing, determines whether the MAC-PDU is transmittable without being fragmented, based on the data quantity, such as a PDU length or number of bytes, which is transmittable, specified by the transmission controller 204. If the PDU is transmittable (fragmentation unnecessary), it is transferred to the selector 229, and if it is not transmittable (fragmentation necessary) it is transferred to the SDU extractor 226.

The SDU extractor 226 is used to separate the PDU, which was judged to be "Fragmentation Necessary" and transferred from the PDU length determiner 221, into the header (GMH) and the SDU (including the subheader) stored in the payload, transfer the SDU (including the subheader) to the packed-SDU fragmenting unit 227, and transfer the header (GMH) to the header assigner 228.

The packed-SDU fragmenting unit 227, taking the addition of the header in the header assigner 228 into account, separates the packed SDU into the SDUs so that each SDU is less than the data quantity specified by the transmission controller 204. The separated SDUs are transferred to the header assigner 228, which in turn adds the header (GMH) to each of the separated SDUs to generate (reconstruct) a plurality of PDUs. Note that the PDU not transmittable is transferred to the PDU buffer 201, in which it is temporarily held and waits until the next transmission timing.

The selector 229, under control of the transmission controller 204, is adapted to selectively transfer the PDU which has been judged to be "Fragmentation Unnecessary" and transferred by the PDU length determiner 221, and the PDU which has been transferred from the header assigner 228, to the encoder 205. Note that in transferring the PDU to the encoder 205, a CRC code can also be added thereto.

(Description of Operation of RS 20)

Figure 11:
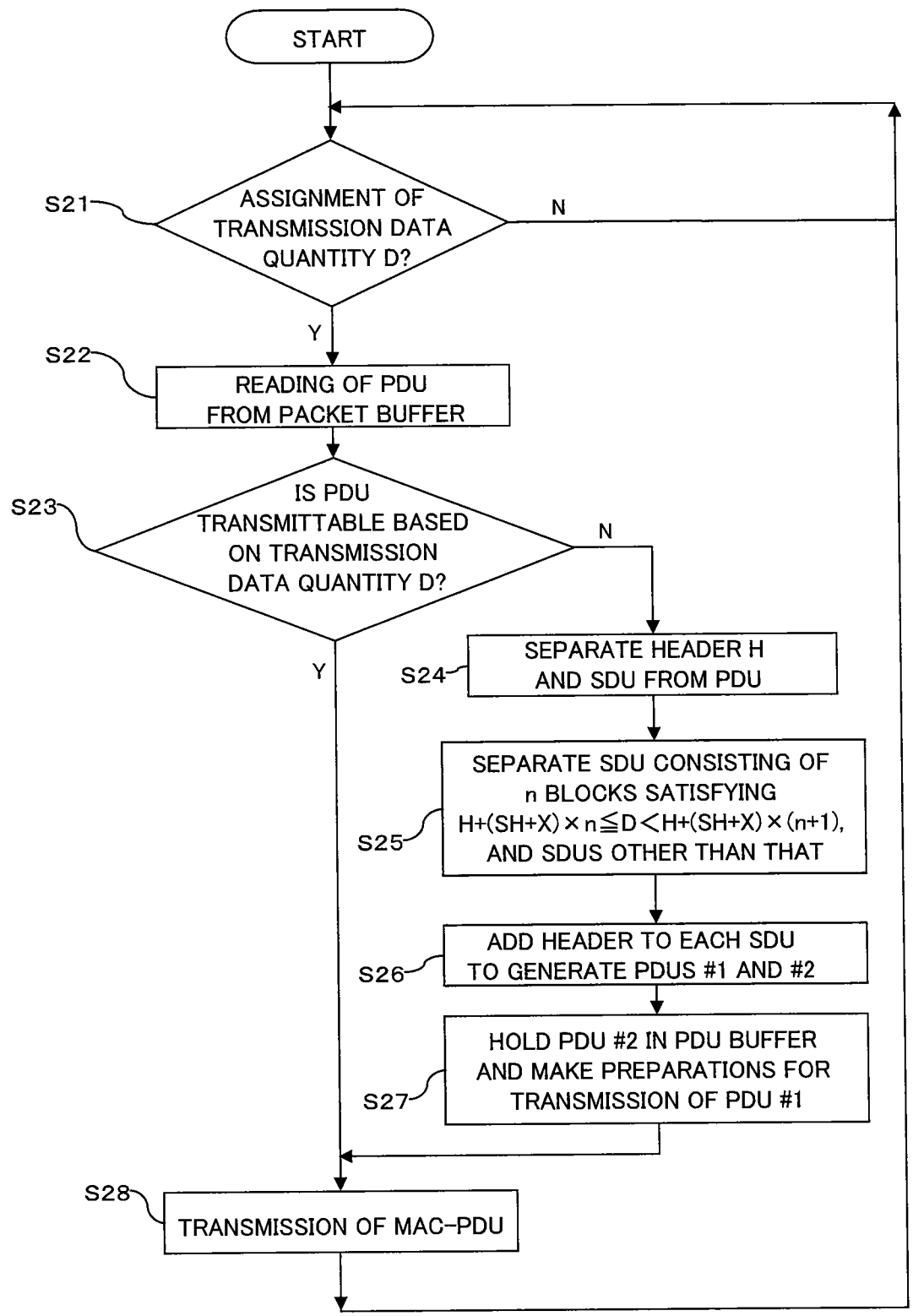
FIG. 11 is a flowchart used for explaining operation of the RS illustrated in FIGS. 6, 8, and 9.
Figure 12:
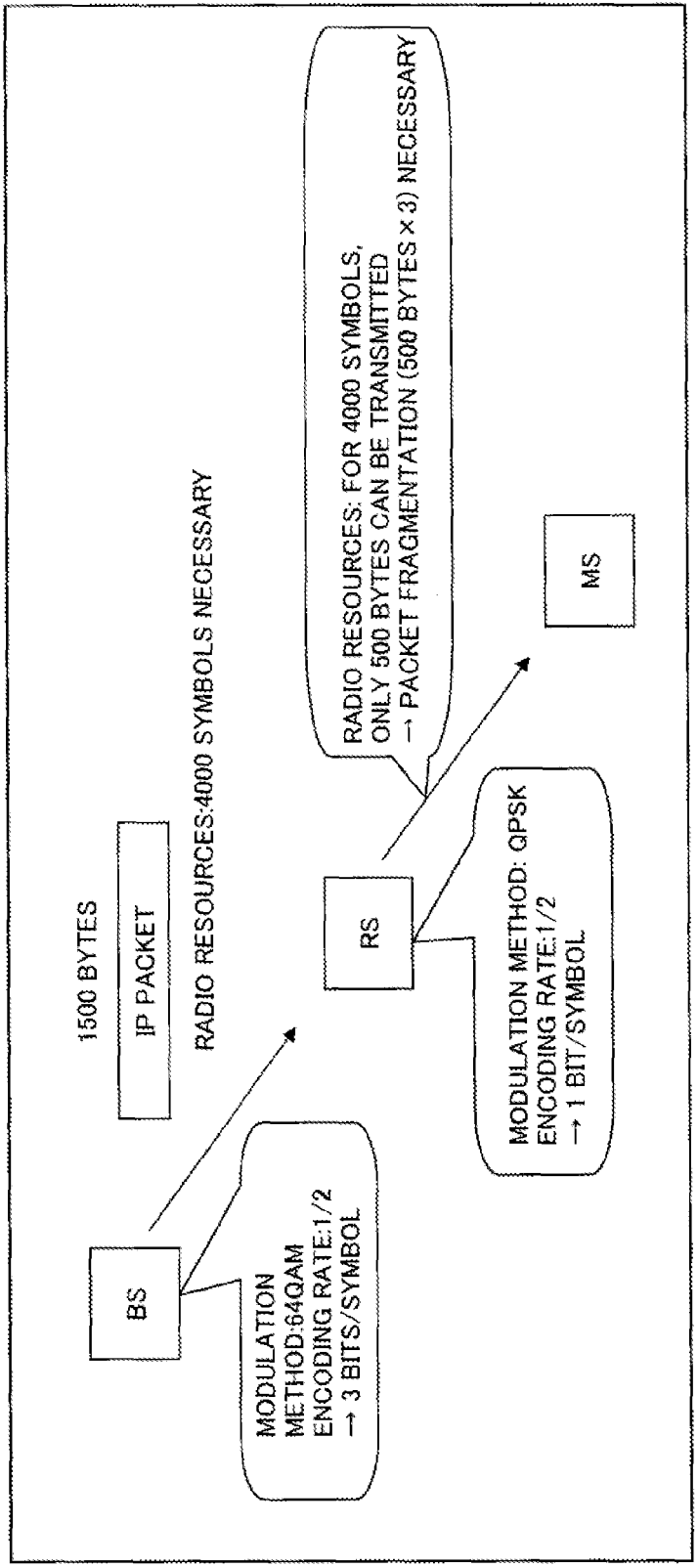
FIG. 12 is a diagram used to explain the necessity of packet fragmentation in the relay station (RS)
Figure 13:
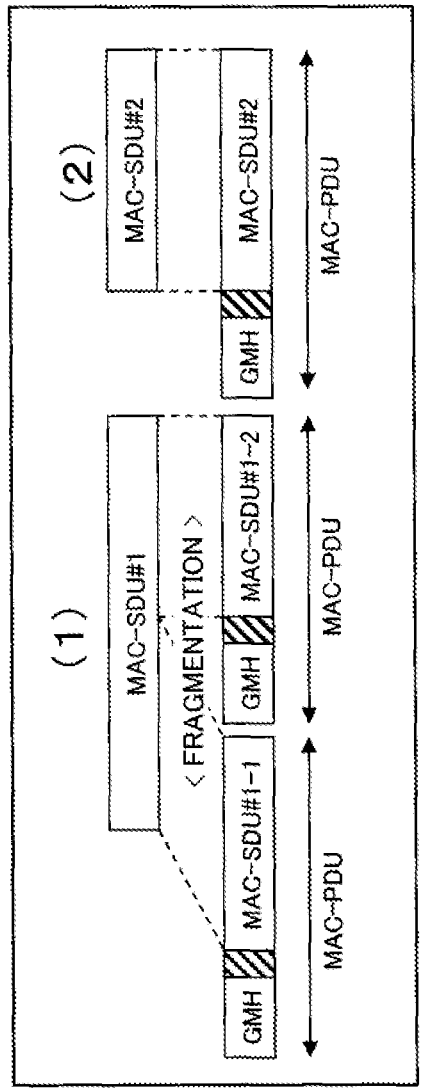
FIG. 13 is a packet format diagram used to explain an example of the packet fragmentation.
Figure 15:
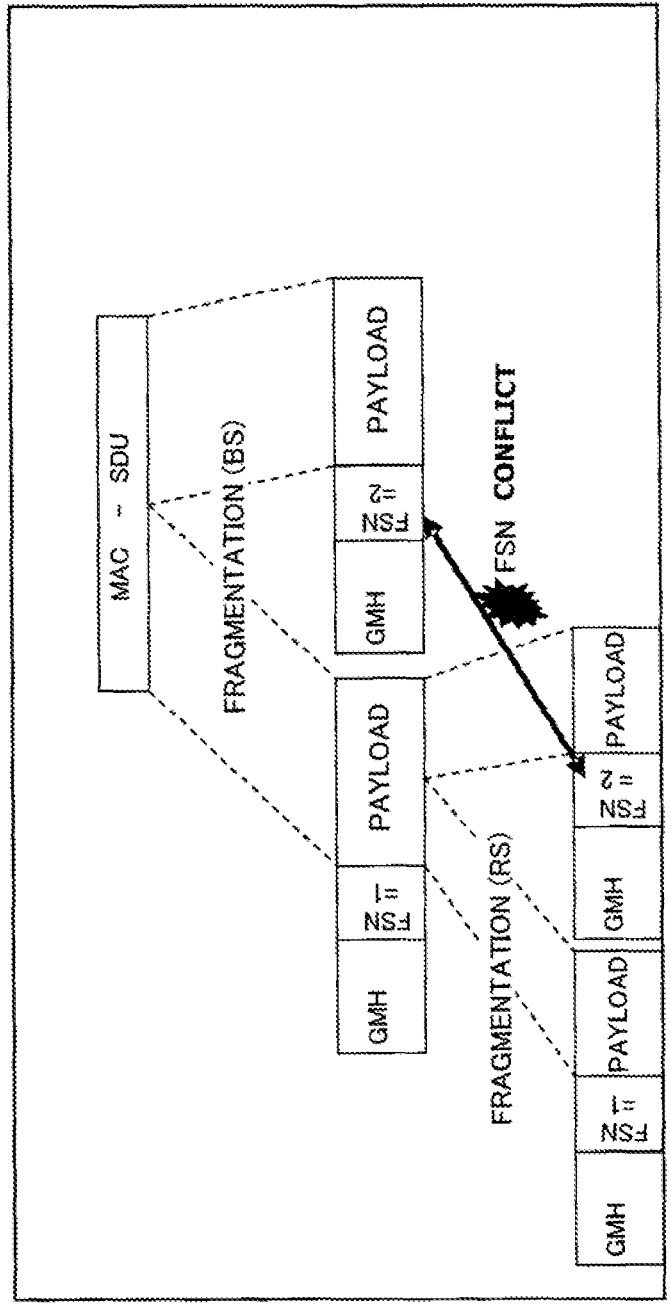
FIG. 15 is a diagram used to explain a problem caused by fragmentation in a relay station.

The operation of the RS 20 of this embodiment configured as described above will be described in detail herein after with reference to a flowchart illustrated in FIG. 11.

In the RS 20, the transmission controller 204 checks whether a transmission data quantity D has been assigned (i.e., whether the packet fragmenting function has been effectively set) (route N of step S21). If it has been assigned, a PDU to be transmitted is read out from the PDU buffer 201 at the aforementioned PDU transmission timing, and is transferred to the PDU reconstructor 214 (route Y of step S21 to Step S22). In the PDU reconstructor 214, on receiving the PDU from the PDU buffer 201, the PDU length determiner 221 determines, based on the specified data quantity D from the transmission controller 204, whether the PDU is transmittable without being fragmented (step S23).

As a result, if it is not transmittable (i.e., if fragmentation is necessary) (route N of step S23), the PDU length determiner 221 transfers the PDU to the SDU extractor 226. The SDU extractor 226 separates the PDU into the header (GMH) (where H is the size of the header) and the SDU stored in the payload, and transfers the SDU to the packed-SDU fragmenting unit 227 and the header to the header assigner 228.

The packed-SDU fragmenting unit 227 separates the packed SDU from the SDU extractor 226 into the first n SDUs [which satisfy H+(SH+X)×n≦D<H+(SH+X)×(n+1) where H is the header length of the header GMH, SH is the length of the subheader, and X is the predetermined data quantity (X<D)] and the remaining SDUs (step S25), and transfers them to the header assigner 228.

The header assigner 228 adds the header (GMH) to each of the SDUs transferred from the packed-SDU fragmenting unit 227 to generate a first PDU #1 and a second PDU #2 (step S26). The second PDU #2 is temporarily held in the PDU buffer 201 until the next transmission timing, while the first PDU #1 is output to the selector 229 to make preparations for transmission (step S27).

On the other hand, when it is determined in step S23 that fragmentation is unnecessary, the PDU length determiner 221 outputs to the selector 229 the PDU transferred from the PDU buffer 201 (route Y of step S23)

The PDU selected in the selector 229 is transferred to the encoder 205, undergoes the required encoding process, modulation process, and wireless transmission process by being passed through the modulator 206 and transmitter 207, and is then transmitted from the antenna 209 via the duplexer 208 (step S28).

As with the first embodiment, a signal received by the antenna 209 undergoes the required wireless reception process, demodulation process, decoding process, CRC-computation process, and other processes by passing through the duplexer 208, receiver 210, demodulator 211, decoder 212, and PDU receiver 213, and is temporarily held in the PDU buffer 201 until the transmission timing that is specified by the transmission controller 204.

Thus, according to this embodiment, in the BS 10 which is a packet sending station, a PDU that is transmitted is previously fragmented into SDUs (blocks) which are used as a unit of fragmentation that is used when fragmentation is needed in the RS 20, and the SDUs are packed as one PDU after the addition of an FSN and an FC to each of them, and the PDU is transferred to the RS 20. Therefore, in the RS 20, FSNs and FCs do not need to be managed as are done in the first embodiment, and by just separating a packed PDU into the SDUs fragmented in the BS 10, it becomes possible to fragment and transmit a packet to the MS 30 without the aforementioned FSN conflict and FC mismatch taking place.

Thus, with a malfunction due to the FSN conflict and FC mismatch in the MS 30 being prevented, it becomes possible for the RS 20 to fragment and relay a received packet according to radio resources such as radio bands available between the RS 20 and the BS 30. Consequently, the utilization of radio resources becomes possible.

Particularly, in the above embodiment, a header (GMH) is added after the packing of SDUs, so the header can be greatly reduced compared with the case where a header is added to each fragment (SDU). Thus, further utilization of radio resources is possible.

[D] Others

In the above embodiments, the QoS class of a PDU may be employed as a reference of whether to fragment. For example, for a PDU whose QoS class is higher than a predetermined reference QoS, instead of fragmenting the PDU and transmitting the remaining part at the next transmission timing, a request for the required radio resources may be made to the transmission controller so that transmission can be performed without fragmentation.

In addition, it may be determined that the fragmentation of a PDU whose payload is encrypted is unnecessary. That is, there are cases where if an encrypted PDU is fragmented without decoding, it cannot be normally decoded at the receiving side. To prevent this, when radio resources can be sufficiently ensured, or when a request for sufficient radio resources is sent to the transmission controller, an encrypted PDU can be transmitted without being fragmented. The presence or absence of encrypted payload can be identified by using identification bits added to the header (which is not encrypted).

Finally, the size of fragmentation may be fixed or variable. The fragmentation size may also be based on the maximum rate between the RS 20 and the MS 30 or a smaller rate than that. However, when it is based on the smaller rate, it is preferable to perform retransmission control such as HARQ etc. at the same time.

INDUSTRIAL APPLICABILITY

As has been described hereinabove, the present invention is capable of preventing the FSN conflict and FC mismatch resulting from further packet fragmentation in RS, so flexible packet fragmentation and relay becomes possible according to radio resources available between RS and MS, and radio resources can be fully utilized. Thus, the present invention is considered extremely useful in the field of wireless communication technology.

The invention claimed is:

1. A relay station for receiving a packet transmitted from a sending station and relaying said packet to a receiving station, the relay station comprising:
   a packet receiver configured to receive a packet fragmented in said sending station;
   a packet fragmenting unit configured to selectively further refragment said packet received by said packet receiver into a plurality of refragmented packets;
   a controller configured to add a sequence number to each of said refragmented packets and to a packet not refragmented in said packet fragmenting unit; and
   a packet transmitting unit configured to transmit to said receiving station each of said packets to which said sequence number has been added by said controller, wherein the sequence number is incremented by one independently for each of connections every time the sequence number is added to each of said refragmented packets and to said packet not refragmented in said packet fragmenting unit, each of the connections being associated with at least one of a destination of the packet and a QoS (Quality of Service) class of the packet,
   wherein the packet fragmenting unit does not refragment said received packet when the QoS class of said received packet is higher than a predetermined reference QoS or payload of said received packet is encrypted.

2. The relay station as set forth in claim 1, wherein said packet fragmenting unit comprises
   a fragmentation determiner that, based on a predetermined reference, determining whether said packet received by said packet receiver is further fragmented into said plurality of refragmented packets, and
   a packet refragmenting unit that refragments said fragmented packet if said fragmentation determiner determines that said fragmented packet is further fragmented.

3. The relay station as set forth in claim 2, wherein if a packet size of said fragmented packet received by said packet receiver exceeds a size that is transmittable to said receiving station at that time, said fragmentation determiner determines that said fragmented packet is further fragmented.

4. The relay station as set forth in claim 1, wherein said controller adds said sequence number to said refragmented packets and said non-refragmented packet regardless of said refragmentation.

5. The relay station as set forth in claim 4, wherein said controller further comprises a sequence number manager that manages said sequence number according to a connection with said receiving station, and said controller adds said sequence number to said refragmented packet and non-refragmented packet of the same connection under management of said sequence number manager.

6. The relay station as set forth in claim 1, wherein there is no conflict among the sequence numbers added by said controller.

7. A relay method for use in a relay station that receives a packet transmitted from a sending station and relays said packet to a receiving station, the relay method comprising:
   receiving a packet fragmented in said sending station;
   selectively further fragmenting said fragmented packet into a plurality of refragmented packets;
   adding a sequence number to each of the refragmented packets and to a non-refragmented packet not fragmented; and
   transmitting to said receiving station each of said packets to which said sequence number has been added, wherein the sequence number is incremented by one independently for each of connections every time the sequence number is added to each of the refragmented packets and to the non-refragmented packet not fragmented, each of the connections being associated with at least one of a destination of the packet and a QoS (Quality of Service) class of the packet,
   wherein said fragmented packet is not further fragmented when the QoS class of said fragmented packet is higher than a predetermined reference QoS or payload of said fragmented packet is encrypted.

8. The relay method as set forth in claim 7, wherein there is no conflict among the sequence numbers.

* * * * *